US008479197B2

(12) United States Patent
Havivi et al.

(10) Patent No.: US 8,479,197 B2
(45) Date of Patent: Jul. 2, 2013

(54) HOST CONTROLLER USING REDUCED NETWORK RESOURCES TO MONITOR HOSTS

(75) Inventors: Shahar Havivi, Ramat-Gan (IL); Livnat Peer, Ramat-Hasharon (IL)

(73) Assignee: Red Hat Israel, Ltd., Raanana (IL)

(*) Notice: Subject to any disclaimer, the term of this patent is extended or adjusted under 35 U.S.C. 154(b) by 483 days.

(21) Appl. No.: 12/757,694

(22) Filed: Apr. 9, 2010

(65) Prior Publication Data

US 2011/0252418 A1    Oct. 13, 2011

(51) Int. Cl.
*G06F 9/455* (2006.01)

(52) U.S. Cl.
USPC .............................................. 718/1

(58) Field of Classification Search
None
See application file for complete search history.

(56) References Cited

U.S. PATENT DOCUMENTS

| 7,181,743 | B2 * | 2/2007 | Werme et al. ............ 718/104 |
| 8,087,082 | B2 * | 12/2011 | Bloch et al. ............ 726/22 |
| 8,209,288 | B2 * | 6/2012 | Friedman et al. ......... 707/638 |

OTHER PUBLICATIONS

Galvin, Peter Baer, "VMware vSphere Vs. Microsoft Hyper-V: A Technical Analysis," Corporate Technologies, CTI Strategy White Paper, 2009, 32 Pages.
"Red Hat Enterprise Virtualization Manager for Servers," 2009, 4 pages, Red Hat, Inc, found at http://www.redhat.com/virtualization.

* cited by examiner

*Primary Examiner* — Gregory Kessler
(74) *Attorney, Agent, or Firm* — Lowenstein Sandler LLP

(57) ABSTRACT

A host controller sends a request for first status information to a host. The host controller receives first status information from the host along with a unique identifier that is associated with the first status information. After a time period, the host controller sends a new request for second status information to the host, the new request including the unique identifier. When second status information and the first status information are associated with the same unique identifier, the host controller receives a response from the host indicating that the second status information is the same as the first status information. When the second status information and first status information are not associated with the same unique identifier, the host controller receives the second status information and a new unique identifier from the host.

18 Claims, 6 Drawing Sheets

# HOST CONTROLLER USING REDUCED NETWORK RESOURCES TO MONITOR HOSTS

TECHNICAL FIELD

Embodiments of the present invention relate to monitoring hosts (e.g., hosts of virtual machines), and more specifically to reducing resource utilization associated with the monitoring of hosts.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, hypervisor (also known as a virtual machine monitor (VMM)) manages allocation and virtualization of computer resources and performs context switching, as may be necessary, to cycle between various VMs.

A host machine is typically enabled to host services, applications, or other processes. A host machine may simultaneously run multiple VMs, where each VM may be used by a local or remote client. The host machine allocates a certain amount of the host's resources to each of the VMs. Each VM is then able to use the allocated resources to execute applications, including operating systems known as guest operating systems.

A host controller may monitor the status of multiple host machines. To perform such monitoring, the host controller periodically polls each of the hosts for that host's status. In response, the host sends status information back to the host controller. The status information often has a size of one or more Megabytes. Thus, the repeated polling and response messages consume a significant amount of network resources. Since status information is often unchanged between polling cycles, the network resources are being unnecessarily consumed.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
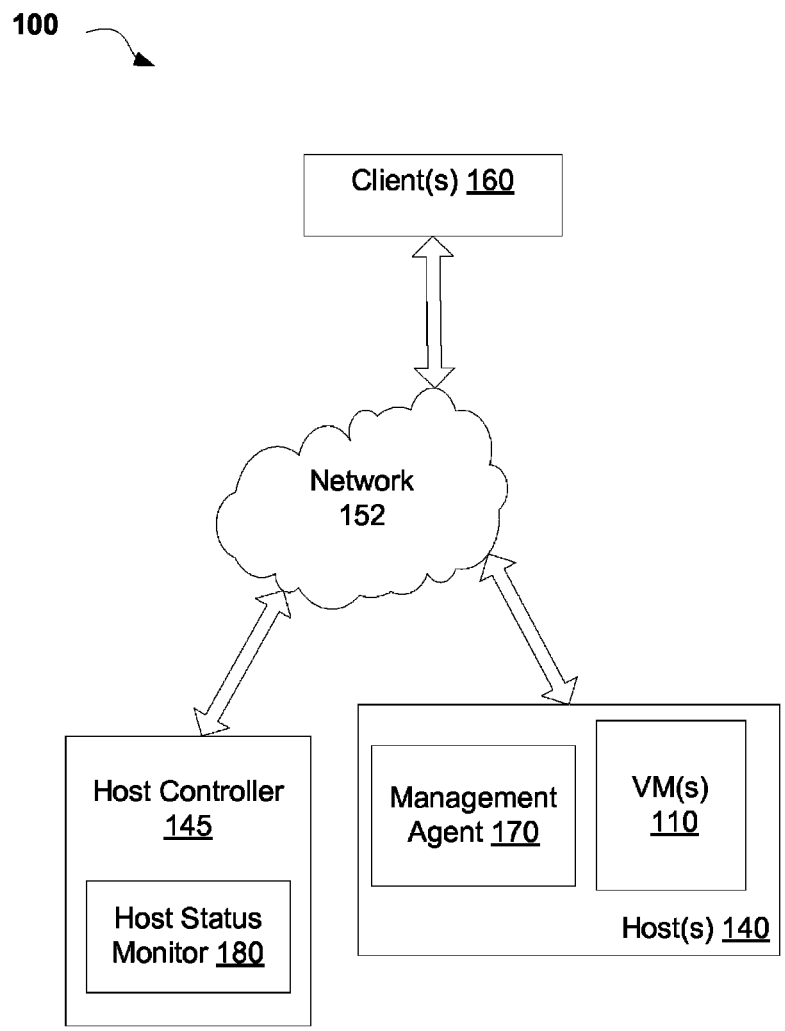
FIG. 1 is a block diagram of a computing system, in which embodiments of the invention may operate.

Embodiments of the invention provide for a mechanism for monitoring hosts using minimal network resources. In one embodiment, a host controller monitors multiple hosts. Each host may or may not host one or more virtual machines. To monitor a host, the host controller sends a request for first status information to the host. The host controller receives first status information from the host along with a first signature value that was generated based on the first status information. The first signature value and first status information may be stored in a database. After a time period, the host controller sends a new request for second status information to the host, the new request including the first signature value. When a second signature value generated based on the second status information matches the first signature value, the host controller receives a response from the host indicating that the second status information is the same as the first status information. When the second signature value generated based on the second status information does not match the first signature value, the host controller receives the second status information and the second signature value from the host. The host controller may then update the database by replacing the first status information and first signature value with the second status information and the second signature value.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "receiving", "identifying", "determining", "polling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as read only memory ("ROM"), random access memory ("RAM"), magnetic disk storage media, optical storage media, flash memory devices, etc.

Figure 2B:
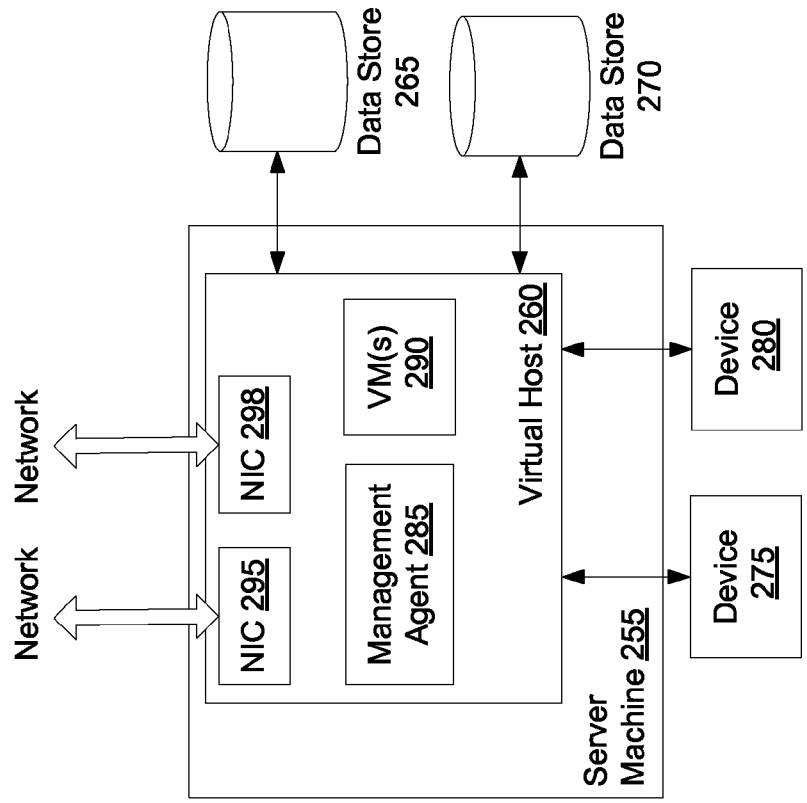
FIG. 2B illustrates a virtual host, in accordance with one embodiment of the present invention.
Figure 2A:
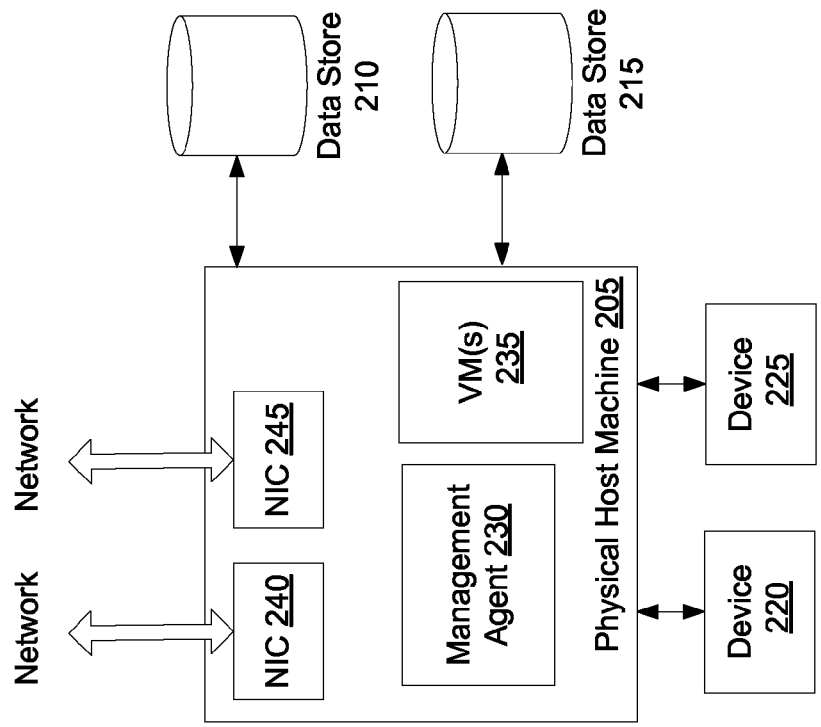
FIG. 2A illustrates a physical host, in accordance with one embodiment of the present invention.

FIG. 1 is a block diagram of a computing system 100, in which embodiments of the invention may operate. The computing system 100 includes, but is not limited to, one or more clients 160 communicatively coupled to one or more hosts 140 or a cluster of hosts 140 over a network 152. The hosts may be physical hosts (as shown in FIG. 2A), virtual hosts (as shown in FIG. 2B), or a combination of physical hosts and virtual hosts. A physical host machine is a hardware computing device enabled to host services, applications, and/or other processes. A virtual host is a virtual machine that runs on top of a hardware computing device, wherein the virtual machine is enabled to host services, applications and/or other processes. The terms host and host machine are used herein to describe both physical and virtual host machines. Therefore, unless specifically called out as a physical host machine or a virtual host machine, wherever host machines are mentioned it should be understood that these may be virtual or physical host machines.

The computing system 100 may also include the clients 160 connected with a host controller 145 over the network 152. Network 152 may be a private network (e.g., a local area network (LAN), a wide area network (WAN), etc.) or a public network (e.g., the Internet), and may be a combination of one or more networks.

One or more hosts 140 may host virtual machines (VM) 110, which may run on top of a hypervisor (also known as a virtual machine monitor (VMM)). Virtual machines 110 can be, for example, hardware emulation, full virtualization, para-virtualization, and operating system-level virtualization virtual machines. Each virtual machine 110 includes a guest operating system (guest OS) that hosts one or more applications within the virtual machine. The guest OSes running on the virtual machines 110 can be of the same or different types (e.g., both may be Windows operating systems, or one may be a Windows operating system and the other a Linux operating system). Moreover, the guest OSes and the host OS may share the same operating system type, or the host OS may be a different type of OS than one or more guest OSes. For example, a guest OS may be a Windows operating system from Microsoft and a host OS may be a Linux operating system available from Red Hat.

In one embodiment, each virtual machine 110 hosts or maintains a desktop environment providing virtual desktops for remote clients (e.g., client 160). A virtual desktop is a virtualized desktop computer, and thus includes storage, an operating system, applications installed on the operating system (e.g., word processing applications, spreadsheet applications, email applications, etc), and so on. However, rather than these functions being provided and performed at the client 160, they are instead provided and performed by a virtual machine 110. In other embodiments, virtual machines 110 are not virtual desktops.

In one embodiment, users access virtual machines 110 remotely via clients 160. Alternatively, users can access virtual machines locally (e.g., via a local display device). Each client 160 may be a personal computer (PC), palm-sized computing device, personal digital assistant (PDA), etc. Clients 160 may be fat clients (clients that perform local processing and data storage), thin clients (clients that perform minimal or no local processing and minimal to no data storage), and/or hybrid clients (clients that perform local processing but little to no data storage). In one embodiment, clients 160 essentially act as input/output devices, in which a user can view a desktop environment provided by a virtual machine (e.g., a running instance of an operating system including storage available to the operating system and programs installed and/or running on the operating system) on a monitor, and interact with the desktop environment via a keyboard, mouse, microphone, etc. In one embodiment, a majority of the processing is not performed at the clients 160, and is instead performed by virtual machines 110 hosted by the host 140.

The host 140 may be coupled to a host controller 145 (via network 152 as shown or directly). The host controller 145 may monitor and control hosts 140, and may further manage virtual machines 110 running on hosts 140. The host controller 145 may manage one or more of provisioning of new virtual machines, connection protocols between clients and virtual machines, user sessions (e.g., user authentication and verification, etc.), backup and restore, image management, virtual machine migration, load balancing, and so on. Host controller 145 may be configured to add a virtual machine, delete a virtual machine, balance the load on the host cluster, provide directory service to the virtual machines, and/or perform other management functions.

The host controller 145 in one embodiment acts as a front end for the hosts 140. Thus, clients 160 and/or I/O devices log in to the host controller 145, and after successful login the host controller 145 connects the clients 160 or I/O devices to virtual machines 110. In another embodiment, clients 160 log directly in to hosts 140 without going through host controller 145.

In one embodiment, the host controller 145 periodically (e.g., every few seconds, every minute, etc.) or continuously polls the hosts 140 to determine statuses of each of the hosts (to obtain status information). The host's 140 status information includes network status information, storage status information, device status information and/or other information. In one embodiment, the host controller 145 includes a host status monitor 180 that performs the polling of the hosts 140. Upon being polled, management agents 170 running on the hosts 140 generate signature values based on the host's 140 current status, and compare the signature values to previously generated signature values. Based on the comparison, the management agent 170 then sends a status report back to the host controller 145. The status report may include the status information and a unique identifier associated with the status information and/or a current signature value, or a message indicating that the status information is unchanged. The host status monitor 180 and management agent 170 are described in greater detail below with respect to FIGS. 3A and 3B, respectively.

FIG. 2A illustrates a physical host, in accordance with one embodiment of the present invention. The physical host 205 in one embodiment corresponds to host 140 of FIG. 1. The physical host 205 includes a bare platform hardware that may be a personal computer (PC), server computer, mainframe, or other computing system. The platform hardware can include a processor, memory, input/output devices, etc. The host may further include a hypervisor. The hypervisor, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc.

In one embodiment, the hypervisor is run directly on bare platform hardware. In another embodiment, the hypervisor is run on top of a host OS. Alternatively, for example, the hypervisor may be run within, or on top of, another hypervisor. Hypervisors may be implemented, for example, in hardware, software, firmware or by a combination of various techniques. The hypervisor presents to other software (i.e., "guest" software) the abstraction of one or more virtual machines (VMs) 235, which may provide the same or different abstractions to various guest software (e.g., guest operating system, guest applications, etc.).

The physical host 205 is connected to one or more data stores 210, 215. Each data store 210, 215 may be a single storage device, or a storage domain that includes one or more storage devices and/or a storage server for managing the storage devices. The data stores 210, 215 may be storage area networks (SAN), network attached storage (NAS), or a combination thereof. Any changes that are made to services, applications, processes, etc. running on the physical host 205 (e.g., changes made to a state of a virtual machine 235 during active sessions for the virtual machine) can be stored in the data stores 210, 215. Changes made to the state of a virtual machine may include, for example, modification to files within the virtual machine, installation of new programs to a guest OS in the virtual machine, receipt of new email at an email client within the virtual machine, etc.

The physical host 205 includes one or more network interface controllers 240, 245 (NICs, also known as network adapters or network interface cards). Each NIC 240, 245 is a hardware device that handles an interface between the physical host 205 and a network. The NICs 240, 245 may connect to the same network or to different networks.

The physical host 205 further includes to one or more devices 220, 225. These may be local storage devices, graphics adapters/cards, sound adapters, peripheral universal serial bus (USB) devices (e.g., a Bluetooth USB dongle), and so on. Devices 220, 225 may be internal devices or external devices that are attached to physical host 205 via a wired or wireless connection, such as Bluetooth, USB, firewire, ZigBee, and so forth.

In response to receiving a request for status information from a host controller, management agent 230 may send a report including detailed status information back to the host controller. The detailed status information may include a status of connectivity to the one or more data stores 210, 215. For example, a report from physical host 205 may indicate that physical host 205 has a connection to data store 210 (e.g., a mount point to data store 210) but not to data store 215. Access to a data store 210, 215 may be lost, for example, if the data store has failed, if a communication link (e.g., a path) to the data store has failed, if there is a problem with a port of the host, if software or firmware included in the host has malfunctioned, or for other reasons. In one embodiment, the status information further identifies a status of paths to the data stores 210, 215. For example, data store 210 may be a multi-path data store that includes two paths to physical host 205. Data may be sent between host 205 and data store 210 via either or both of the available paths. If one of the paths becomes disabled, then communications can still be exchanged via the remaining path.

In one embodiment, the status information includes a status of network connectivity for each NIC 240, 245 of the physical host 205 (referred to herein as network status information). Accordingly, the status information may identify which NICs 240, 245 are connected to a network and/or a network to which they are connected. The network status information may also identify, for example, a specific bridge that a NIC is connected to.

In one embodiment, the status information includes a status of internal and external devices connected to physical host 205. The device status information may identify the devices, indicate how the devices are connected to the physical host (e.g., via an internal connection, a Bluetooth connection, a USB connection, etc.), and/or list other information associated with the device. For example, if device 220 is a USB storage device, the device status information may identify the storage capacity for device 220.

In one embodiment, status information that is sent back to the host controller further includes information pertaining to management agent 230. The management agent 230 is a daemon or other application that runs on a host (e.g., physical host 205), and that gathers status information about the host. Management agents are described in greater detail below with reference to FIG. 3A. Status information that pertains to a management agent may identify a software version of management agent 230 and/or other information about the management agent 230. If, for example, management agent 230 was updated since a last status report was sent to the host controller, management agent 230 may report that it now has a new version number. The status information may also include software version data for additional software components or applications running on the physical host 205. For example, version information of the hypervisor, of the VMs 235 and/or of other applications may be included in the status information.

In addition to sending status information back to the host controller, the management agent 230 may also generate a unique identifier for the status information and/or generate a signature value from the status information. The unique identifier and/or signature value may be sent to the host controller along with the status information.

FIG. 2B illustrates a virtual host 260 in accordance with one embodiment of the present invention. The virtual host 260 in one embodiment corresponds to host 140 of FIG. 1. The virtual host 260 includes an emulation of underlying bare platform hardware of the server machine 255, which may be a personal computer (PC), server computer, mainframe, or other computing system. The platform hardware can include a processor, memory, input/output devices, etc. The virtual host 260 may include a virtual machine that runs on top of a hypervisor. Unlike a physical host 205, a virtual host 260 may share the same machine 255 with one or more other virtual hosts (not shown) and/or with a host controller (not shown).

The virtual host 260 appears to clients and to the host controller as a physical host. Accordingly, the virtual host 260 includes some or all of the components that were discussed with reference to the physical host 205. The virtual host 260 is connected to one or more data stores 265, 270 (or one or more virtual representations of data stores). The virtual host 260 includes one or more virtual NICs 295, 298 that are virtualizations of underlying hardware NICs of server machine 260. The virtual host 260 may also include one or more virtual devices 275, 280, which may be virtualizations of local storage devices, graphics adapters/cards, sound adapters, peripheral universal serial bus (USB) devices, or other hardware devices connected to server machine 255. Additionally, the virtual host 260 includes one or more applications (not shown) whose version information may be tracked.

Virtual host 260 includes a management agent 285 that functions in the manner described above with reference to management agent 230. Accordingly, in response to receiving a request for status information from a host controller, management agent 285 may send detailed status information back to the host controller, which may include device status information, storage status information, network status information, and so on. The management agent 285 may also generate unique identifiers and/or signature values and send them to the host controller.

Multiple virtual hosts may be located on a single server machine 255. Each virtual host machine, whether on the same or different server machines, has its own device list, NICs, connected data stores, etc. Each virtual host machine may be separately registered as a host machine with the host controller. Accordingly, the host controller may poll a single server machine multiple times, once for each virtual host operating on the server machine. This may increase network resource usage, making the host monitoring optimizations presented herein even more effective.

Figure 3A:
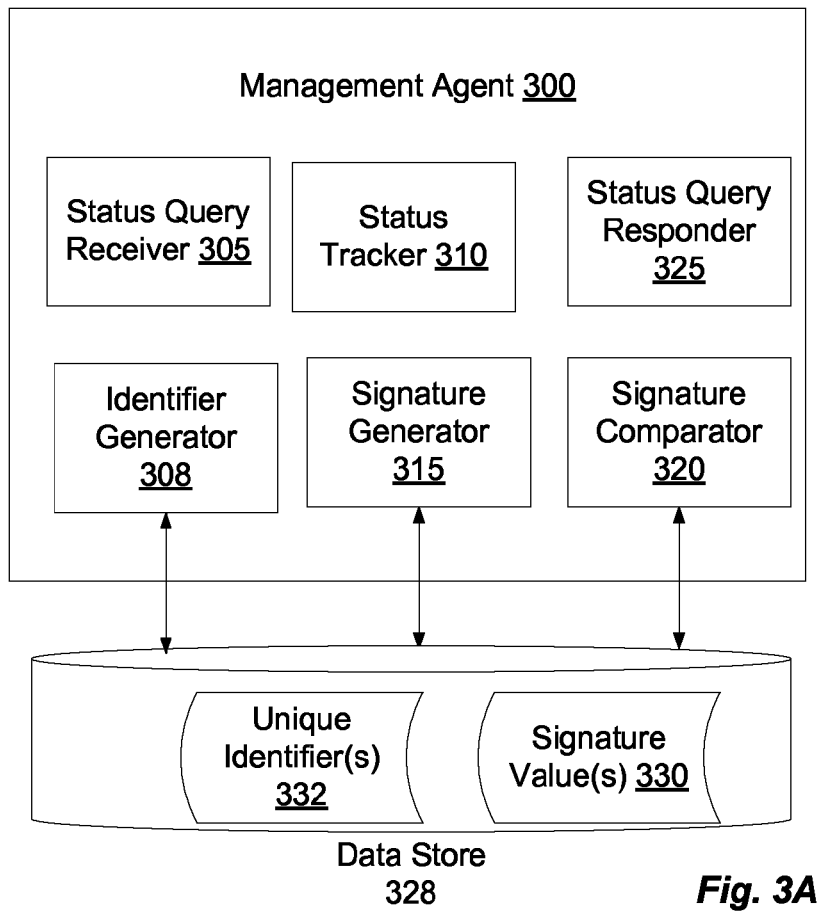
FIG. 3A is a block diagram illustrating a management agent, in accordance with one embodiment of the present invention.

FIG. 3A is a block diagram illustrating a management agent 300, in accordance with one embodiment of the present invention. The management agent 300 may correspond to one or more of management agent 170 of FIG. 1, management agent 230 of FIG. 2A or management agent 285 of FIG. 2B. In one embodiment, management agent 300 includes a status query receiver 305, a status tracker 310, a signature generator 315, a signature comparator 320, an identifier generator 308 and a status query responder 325.

Status query receiver 305 receives status queries from a host controller. The status queries may be received on a periodic or continuous basis. For example, status queries may be received every second, every 3 seconds, every 10 seconds, every minute, or at some other interval. Received status queries may include a previous signature value and/or a unique identifier associated with a previous signature value or previous status information.

Status tracker 310 monitors one or more properties of a host on which management agent 300 runs. Status tracker 310 may maintain an updated status information report that includes connectivity to data stores, network connectivity, attached device status, version status of management agent 300 and/or additional information. Alternatively, status tracker 310 may determine the updated status information in response to status query receiver 305 receiving a status query.

After a status query is received by status query receiver 305 and status tracker 310 has determined current status information of the host, signature generator 315 generates a unique signature based on the status information. Signature generator 315 uses a fingerprinting algorithm to generate the unique signature from the status information. Examples of fingerprinting algorithms that may be used include Rabin's algorithm, a cyclic redundancy check (CRC) algorithm, and a hashing algorithm (e.g., for generating cryptographic hashes). Various hashing algorithms may be used to generate the unique signature value. For example, signature generator 315 may use the message-digest algorithm 5 (MD5) hashing algorithm, Bob Jenkins (BJ) hashing algorithm, Fowler-No-Vo (FNV) hashing algorithm, secure hash algorithm (SHA), or some other hashing algorithm. In one embodiment, the signature value has a size of approximately 40 bytes, and the status information from which the signature value is generated has a size of up to one or a few Megabytes.

Signature generator 315 may store generated signature values 330 in a data store 328 (e.g., a cache). One or more signature values 330 may be stored in the data store 328. In one embodiment, a current signature value and/or a previous signature value are stored. Alternatively, numerous signature values may be stored (e.g., an hour's worth of signature values, a day's worth of signature values, tens, hundreds or thousands of signature values, and so on). When a new signature value is generated, the oldest signature value may be removed from the data store 328 (e.g., if a cache is full), and the new signature value may be added to the data store.

Signature comparator 320 compares the current signature value to a previously generated signature value (typically the last signature value). The previously generated signature value may be stored in the data store 328, or may have been received from the host controller along with the request for status information. If the signature values are different, then signature comparator 320 determines that current status information is different from previous status information. For example, a connection to a data store 328 may have been removed, the management agent 300 may have been updated, a new device may have been connected to the host, and so on. If the signature values are the same, the signature comparator 320 determines that there has been no change in the status information. Signature comparator 320 directs status query responder to generate a status information update/report, and send the update/report to the host controller.

In one embodiment, identifier generator 308 generates a unique identifier 332 for the current information status. The unique identifier may be a random or sequential integer. For example, a first status information may be assigned a unique identifier of 001, a second status information may be assigned a unique identifier of 002, and so on. The unique identifier may be generated independent of contents of the status information.

The unique identifier 332 may be stored in the data store 328 along with the signature value 330 for the current information status. In one embodiment, each entry in the data store 328 includes a unique identifier and a signature value. Therefore, a signature value may be looked up based on the associated unique identifier. For example, status queries received by the status query receiver 305 may include a unique identifier. Signature comparator 320 may look up the unique identifier in the data store 328 to find a previous signature value associated with the unique identifier. The signature comparator 320 may then compare the current signature value to the previous signature value associated with the received unique identifier.

In one embodiment, the identifier generator 308 and the signature generator 315 are a single component of the management agent 300. In such an embodiment, the signature value is used as a unique identifier (one based on the contents of the status information), and no separate unique identifier is generated.

Status query responder 325 generates a message stating that there has been no change in the status information if signature comparator 320 determined that the current signature value matches the previous signature value. If there has been a change in the signature value, the status query responder 325 generates a report that includes the current status information. The report may also include the current signature value and/or a unique identifier associated with the current signature value. Once the report is complete, the status query responder sends the report to the host controller.

Figure 3B:
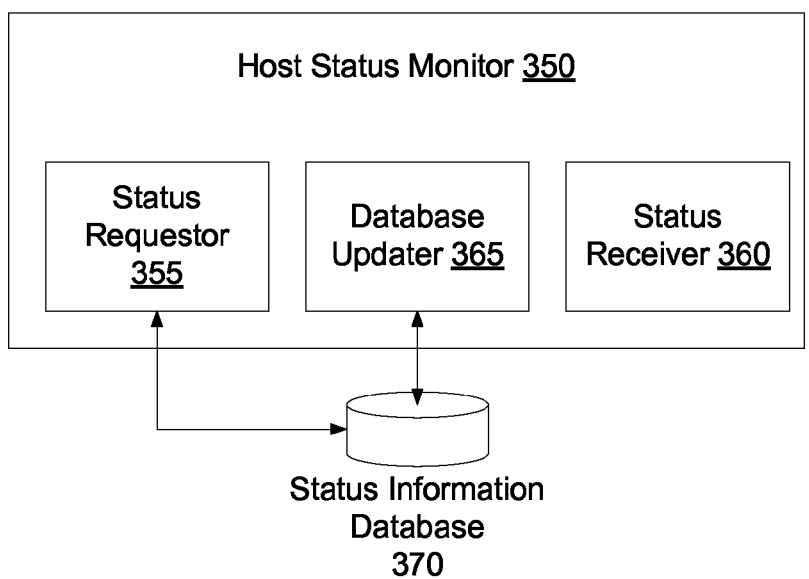
FIG. 3B is a block diagram illustrating a host status monitor, in accordance with one embodiment of the present invention.

FIG. 3B is a block diagram illustrating a host status monitor 350, in accordance with one embodiment of the present invention. The host status monitor 350 may correspond to host status monitor 180 of FIG. 1. In one embodiment, host status monitor 350 includes a status requestor 355, database updater 365 and status receiver 360.

Status requestor 355 generates periodic status requests. Status requestor 355 opens a connection to a management agent 300 of a host, and sends the request for status information to the management agent running on that host. Status requests may be sent to hosts every second, every 5 seconds, etc. The frequency with which status requests are sent to hosts may be a configurable property. If there is an entry for the host in a status information database 370, status requestor 355 may attach a signature value and/or unique identifier stored in the entry to the status request. This can notify the management agent 300 what the last status of the host was. Status receiver 360 then receives the requested report, which includes status information. The requested report may also include a unique signature value generated from the status information or a unique identifier associated with the signature value and the status information if the status information is different from previously received status information. In one embodiment, received status reports are extended markup language (XML) files having a size of up to one or more Megabytes. If the host's status information is unchanged, the received report indicates that there has been no change in status information. In such an instance, the report does not include the status information, a signature value or a unique identifier.

When new status information, signature values and/or unique identifiers are received, database updater 365 stores the status information, signature values and/or unique identifiers in the status information database 370. Alternatively, database updater 365 may be a data store updater that maintains host status information in some other form of data store (e.g., a file system). The status information database 370 (or other data store) may include a separate entry for each host that is managed by the host controller. When new status information, unique identifiers and/or signature values for a host are received, they may replace the old status information, unique identifier and/or signature value for the entry associated with that host. By only receiving status information for a host when the status information has changed, network resource utilization is reduced. Moreover, the number of accesses to the status information database 370 are also reduced, which reduces processor resource utilization and input/output (I/O) resource utilization.

Figure 4:
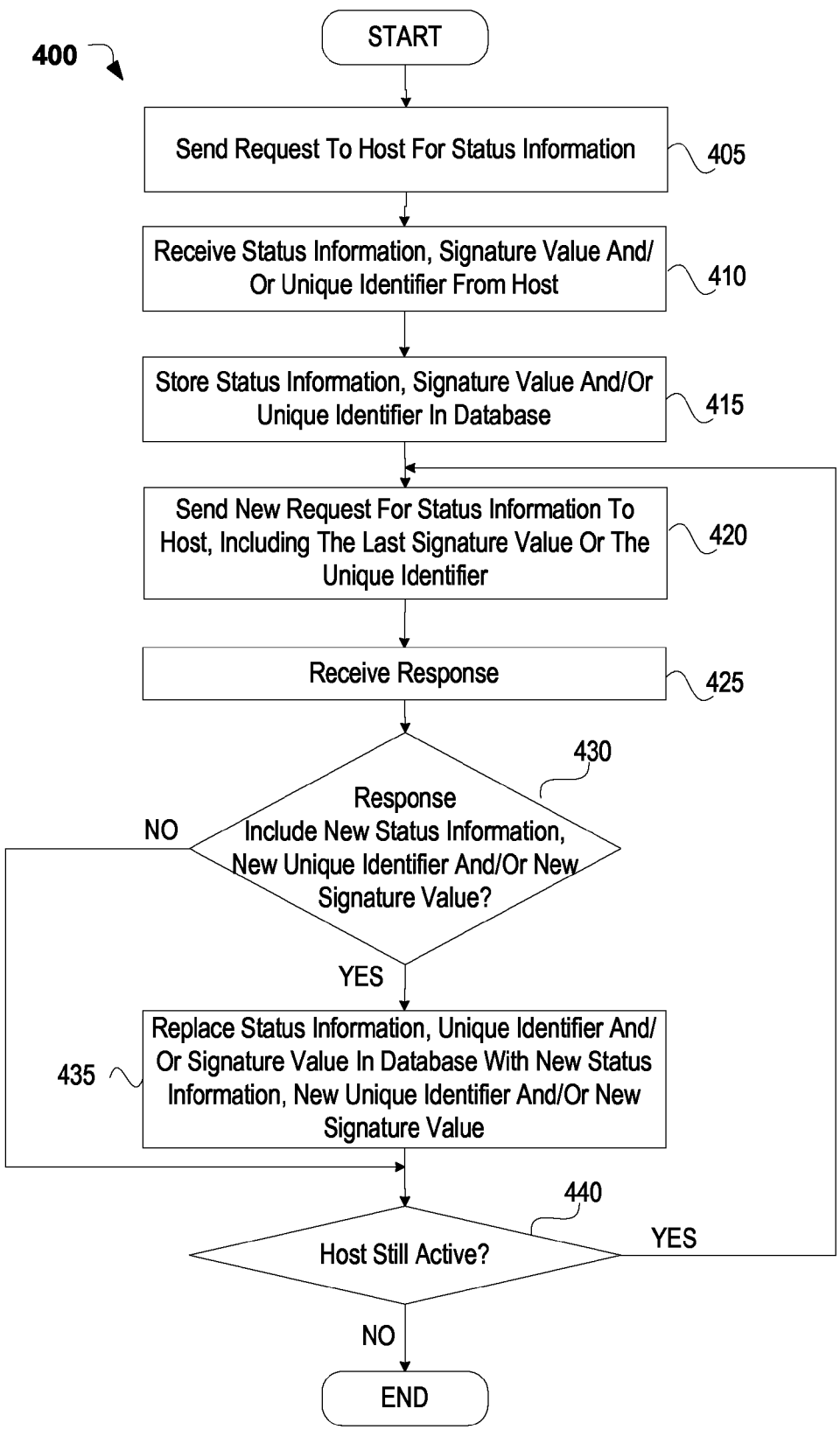
FIG. 4 is a flow diagram illustrating a method for one embodiment of monitoring hosts by a host controller.

FIG. 4 is a flow diagram illustrating a method 400 for one embodiment of monitoring hosts by a host controller. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by a host status monitor (e.g., host status monitor 180 of FIG. 1).

Referring to FIG. 4, at block 405 a host controller sends a request to a host for status information. At block 410, the host controller receives status information and a signature value from the host. The signature value is a unique value that was generated based on the received status information. Alternatively, the host controller may receive the status information along with some other type of unique identifier. The status information may be XML formatted data that is up to 1 MB or larger. At block 415, the host controller stores the status information, signature value and/or unique identifier in a database or other data store.

At block 420, the host controller sends a new request for status information to the host. In one embodiment, the new request includes the previously received signature value. In another embodiment, the new request includes a unique identifier other than the signature value. The new request may be sent some predetermined time period after the previous request was sent (e.g., 3 seconds after the previous request was sent). At block 425, the host controller receives a new response/report from the host. At block 430, the host controller determines whether the new response includes new status information and a new signature value or unique identifier. If the latest report does include new status information and a new signature value or unique identifier, the method continues to block 435. Otherwise, the method continues to block 440.

At block 435, the host controller replaces the status information and signature value and/or unique identifier in the database (or other data store) with the new status information and the new signature value and/or unique identifier.

At block 440, the host controller determines whether the host is still active. If the host is still active, the method returns to block 420, and another request for status information is sent to the host. If the host is no longer active, the method ends.

Figure 5:
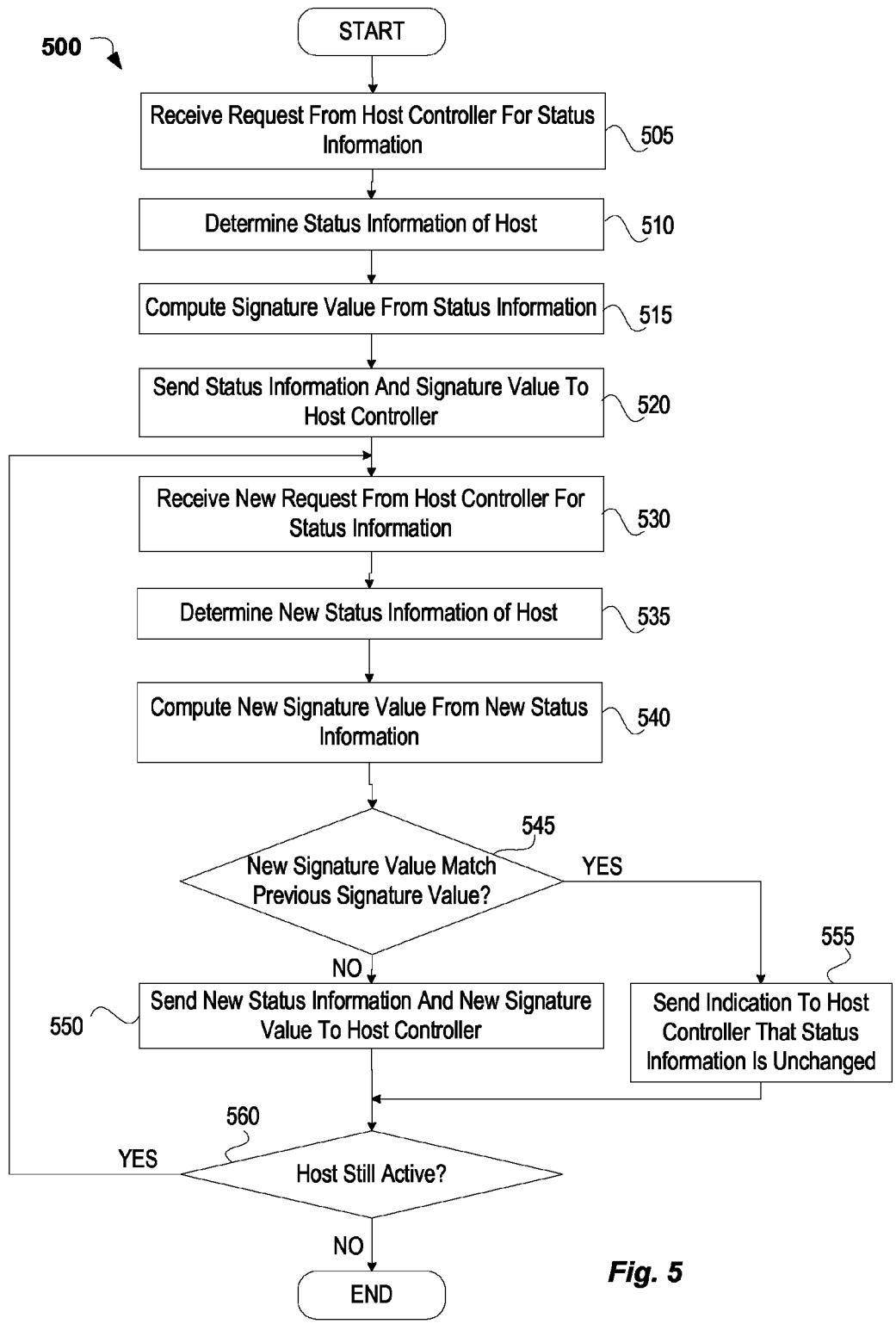
FIG. 5 is a flow diagram illustrating a method for one embodiment of updating a host controller of a host's status.

FIG. 5 is a flow diagram illustrating a method 500 for one embodiment of updating a host controller of a host's status. Method 500 may be performed by processing logic that may comprise hardware (e.g., circuitry, dedicated logic, programmable logic, microcode, etc.), software (such as instructions run on a processing device), or a combination thereof. In one embodiment, method 500 is performed by a management agent (e.g., management agent 170 of FIG. 1).

Referring to FIG. 5, at block 505 a management agent running on a host receives a request for status information from a host controller. At block 510, the management agent determines current status information of the host. At block 515, the management agent computes a signature value from the status information. The management agent may also generate a unique identifier for the status information. At block 520, the management agent sends the status information and the signature value to the host controller. Alternatively, the management agent may send the status information and the unique identifier to the host controller.

At block 530, the management agent receives a new request for status information from the host controller. In one embodiment, the request includes a previous signature value that was sent to the host controller. In another embodiment, the management agent may store the previous signature value that was sent to the host controller, and so there may be no need for the host controller to send the last signature value back to the management agent. In another embodiment, the request includes a unique identifier, which the management agent uses to identify the previous signature value in a local data store. Alternatively, the request may include neither a signature value or any other unique identifier, and the management agent may be configured to retrieve the last stored signature value for comparison. At block 535, the management agent determines new status information of the host. At block 540, the management agent computes a new signature value from the new status information.

At block 545, the management agent compares the new signature value to the previous signature value, which may have been retrieved from a local data store or received from the host controller. If the new signature value matches the previous signature value, the method proceeds to block 555, and the management agent sends an indication to the host controller that the status information has not changed. Otherwise, the method continues to block 550, and the management agent sends new status information to the host controller. At block 550, the management agent may also generate a new unique identifier for the new status information and send the new unique identifier to the host along with the new status information. Alternatively, the management agent may send the new signature value to the host controller along with the new status information. The new unique identifier and/or new signature value may also be stored in a local data store.

At block 560 if the host is still active, the method returns to block 530 and the management agent receives another new request for status information, which may include the last signature value sent to the host controller. If the host is no longer active, the method ends.

Methods 400 and 500 together enables a host controller to monitor hosts using minimal network resources. These methods also reduce additional computing resources (e.g., processor resources and I/O resources) of the host controller by reducing database (or other data store) queries.

Figure 6:
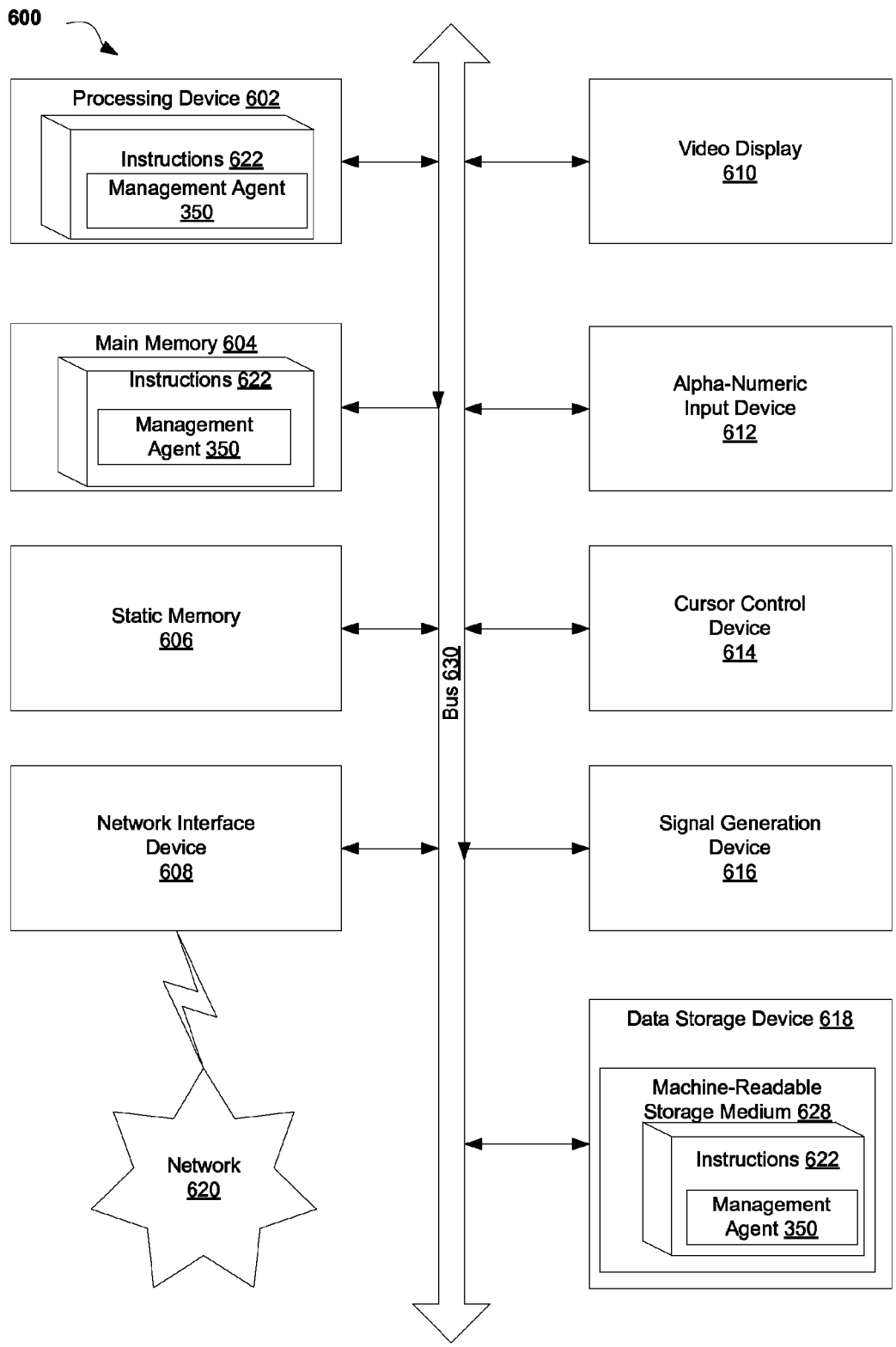
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., instructions 622) for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media.

The machine-readable storage medium 628 may also be used to store instructions for a management agent 170 or host status monitor 180 of FIG. 1, and/or a software library containing methods that call a management agent or host status monitor. While the machine-readable storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing or encoding a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
   receiving a request for status information of a host from a host controller by a processing device executing a management agent, the request comprising a previous signature value previously computed based on previous status information of the host;
   determining, by the processing device, current status information of the host on which the management agent runs, wherein the previous status information and the current status information each comprise at least one of a network status of the host that indicates network connectivity or a storage status of the host that indicates connectivity to one or more data stores;
   computing a current signature value based on the current status information, wherein computing the current signature value comprises applying a fingerprinting algorithm to the current status information;
   comparing the current signature value to the previous signature value;
   responsive to determining that the current signature value matches the previous signature value, sending a response to the host controller indicating that the current status information is the same as the previous status information; and responsive to determining that the current signature value does not match the previous signature value, sending the current signature value along with the current status information to the host controller.

2. The method of claim 1, wherein the previous status information and the current status information each comprise a status of internal and external devices of the host and version data for components of the host.

3. The method of claim 1, wherein the storage status of the host further indicates paths to the one or more data stores.

4. The method of claim 1, wherein the fingerprinting algorithm comprises a hashing algorithm.

5. The method of claim 1, wherein the host comprises a virtual machine.

6. The method of claim 1, wherein the host comprises a physical machine that comprises the processing device.

7. A computing system comprising:
a computing device having a memory to store first instructions for a management agent, and a processing device, connected with the memory, to execute the first instructions, wherein the first instructions cause the processing device to:
receive a request for status information of a host from a host controller, the request comprising a previous signature value previously computed based on previous status information of the host;
determine current status information of the host on which the management agent runs, wherein the previous status information and the current status information each comprise at least one of a network status of the host that indicates network connectivity or a storage status of the host that indicates connectivity to one or more data stores;
compute a current signature value based on the current status information, wherein computing the current signature value comprises applying a fingerprinting algorithm to the current status information;
compare the current signature value to the previous signature value;
send a first response to the host controller indicating that the current status information is the same as the previous status information responsive to determining that the current signature value matches the previous signature value; and
send a second response to the host controller responsive to determining that the current signature value does not match the previous signature value, the second response comprising the current signature value and the current status information.

8. The computing system of claim 7, wherein the host comprises a virtual machine that executes on the computing device.

9. The computing system of claim 7, further comprising:
an additional computing device having an additional memory to store second instructions for a host controller and an additional processing device, connected with the additional memory, to execute the second instructions, wherein the second instructions cause the additional processing device to:
generate the request for the status information;
send the request for status information to the first computing device; and
receive the response.

10. The computing system of claim 9, further comprising:
a data store, connected to the additional computing device, to store the previous signature value and the previous status information;
wherein the instructions to cause the additional processing device to retrieve the previous signature value from the data store and attach the previous signature value to the request.

11. The computing system of claim 10, further comprising the additional instructions to cause the additional processing device to:
responsive to receiving a response that comprises the current status information and the current signature value from the computing device, replace the previous status information and the previous signature value in the data store with the current status information and the current signature value.

12. The computing system of claim 7, wherein the host comprises the computing device.

13. A non-transitory computer-readable storage medium including instructions that, when executed by a processing device, cause the processing device to perform operations, comprising:
receiving a request for status information of a host from a host controller by the processing device, the request comprising a previous signature value previously computed based on previous status information of the host;
determining, by the processing device, current status information of the host on which the management agent runs, wherein the previous status information and the current status information each comprise at least one of a network status of the host that indicates network connectivity or a storage status of the host that indicates connectivity to one or more data stores;
computing a current signature value based on the current status information, wherein computing the current signature value comprises applying a fingerprinting algorithm to the current status information;
comparing the current signature value to the previous signature value;
responsive to determining that the current signature value matches the previous signature value, sending a response to the host controller indicating that the current status information is the same as the previous status information; and
responsive to determining that the current signature value does not match the previous signature value, sending the current signature value along with the current status information to the host controller.

14. The non-transitory computer-readable storage medium of claim 13, wherein the previous status information and the current status information each comprise a status of internal and external devices of the host and version data for components of the host.

15. The non-transitory computer-readable storage medium of claim 13, wherein the storage status of the host further indicates paths to the one or more data stores.

16. The non-transitory computer-readable storage medium of claim 13, wherein the fingerprinting algorithm comprises a hashing algorithm.

17. The non-transitory computer-readable storage medium of claim 13, wherein the host comprises a virtual machine.

18. The non-transitory computer-readable storage medium of claim 13, wherein the host comprises a physical machine that comprises the processing device.

* * * * *